US011438160B2

(12) United States Patent
Nicolas et al.

(10) Patent No.: US 11,438,160 B2
(45) Date of Patent: Sep. 6, 2022

(54) PRIVATE ISSUANCE OF ASSETS AND APPLICATIONS THEREOF

(71) Applicant: QED-IT SYSTEMS LTD., Tel Aviv-Jaffa (IL)

(72) Inventors: Aurélien Renaud François Nicolas, Berlin (DE); Ron Kahat, Tel Aviv (IL); Yakov Gurkan, Netanya (IL)

(73) Assignee: QED-it Systems Ltd., Tel Aviv-Jaffa (IL)

( * ) Notice: Subject to any disclaimer, the term of this patent is extended or adjusted under 35 U.S.C. 154(b) by 0 days.

(21) Appl. No.: 16/554,238

(22) Filed: Aug. 28, 2019

(65) Prior Publication Data

US 2020/0328895 A1    Oct. 15, 2020

(30) Foreign Application Priority Data

Apr. 9, 2019  (SG) .......................... 10201903151W

(51) Int. Cl.
*H04L 9/06*      (2006.01)
*H04L 9/32*      (2006.01)
(Continued)

(52) U.S. Cl.
CPC ........ *H04L 9/3221* (2013.01); *G06F 16/1834* (2019.01); *H04L 9/0637* (2013.01); *H04L 9/3213* (2013.01); *G06Q 20/0658* (2013.01)

(58) Field of Classification Search
CPC ... H04L 9/3221; H04L 9/3213; H04L 9/0637; G06F 16/1834; G06Q 20/0658
(Continued)

(56) References Cited

U.S. PATENT DOCUMENTS 10,298,395 B1 *  5/2019  Schiatti ................. H04L 9/3239
11,080,665 B1 *  8/2021  Poelstra ................ H04L 9/3239
(Continued)

FOREIGN PATENT DOCUMENTS

CN       109035029 A     12/2018
WO       2019006446 A1    1/2019

OTHER PUBLICATIONS

Tokenization: Open Asset Protocol on Blockchain, Li etal, Mar. 2019 (Year: 2019).*
(Continued)

*Primary Examiner* — Jahangir Kabir
(74) *Attorney, Agent, or Firm* — Sterne, Kessler, Goldstein & Fox P.L.L.C.

(57) ABSTRACT

Disclosed herein are system, method, and computer program product embodiments for issuing assets and/or asset tokens using zero-knowledge proofs ("ZKPs"). An issuance system may receive a command to issue an asset. The issuance system may determine that issuing the assets would not violate administrator-defined or network-defined rules that may govern the types of assets and/or the quantity of assets that the issuance system may issue. The issuance system may then issue the assets and generate a ZKP corresponding to the issuance and indicating adherence to the rules while concealing information related to the asset token, such as the types of assets and/or quantity of assets. The issuance system may publish the ZKP to a blockchain so that verifier nodes may confirm that the issuance system adhered to the rules while still preventing access to the underlying issuance information.

20 Claims, 4 Drawing Sheets

(51) Int. Cl.
*G06F 16/182* (2019.01)
*G06Q 20/06* (2012.01)

(58) Field of Classification Search
USPC .......................................... 726/2–7, 9–10, 30
See application file for complete search history.

(56) References Cited

U.S. PATENT DOCUMENTS

| | | | |
|---|---|---|---|
| 2011/0047078 A1* | 2/2011 | Ginter | ..................... G06F 21/33 |
| | | | 705/53 |
| 2018/0315026 A1 | 11/2018 | Kraemer et al. | |
| 2019/0034923 A1 | 1/2019 | Greco et al. | |
| 2019/0244290 A1* | 8/2019 | Massacci | ................ G06F 21/64 |
| 2020/0034352 A1* | 1/2020 | Li | ..................... G06Q 20/3829 |

OTHER PUBLICATIONS

Zero-Knowledge Proof: Verifying Blockchain Transactions with Less Risk, Mar. 6, 2019, accessed on Aug. 23, 2019, 2 pages, website: https://medium.com/altoros-blog/zero-knowledge-proofverifying-blockchain-transactions-with-less-risk-eceb778edf6.

Search Report and Written Opinion from Intellectual Property Office of Singapore directed to related International Patent Application No. 10201903151W, dated May 14, 2019, 9 pages.

* cited by examiner

PRIVATE ISSUANCE OF ASSETS AND APPLICATIONS THEREOF

BACKGROUND

Field

This field is generally related to cryptography, zero-knowledge proofs, and blockchain technology.

Related Art

When information or data is exchanged between parties, the question of whether the information can be trusted arises. A party receiving information may question whether the received information is truthful. For example, the party receiving the information may wish to verify that the information received is accurate and that the sending party has not fabricated false information. Further, the receiving party may wish to verify that a third-party has not tampered with the received information.

In some cases, the sending party may wish to deliver information to the receiving party without exposing private underlying data used to generate the information. For example, the sending party may wish to report an average temperature measurement but may not wish to expose the individual sensor measurements from each temperature sensor. In this manner, the sending party may wish to use a mechanism that proves that the reported average temperature measurement sent to the receiving party used all of the sensor measurements and also applied the proper formula for calculating the average. One way of ensuring privacy while verifying accuracy is using a zero-knowledge proof ("ZKP").

In other words, a party may compute a function on data that it wants to keep confidential and share the result of the function with another party. The ZKP allows a party to verify that the function was properly applied to the data, without having to share the data itself. This allows the other party to verify the integrity of the function and the accuracy of the result without knowing the underlying data. One example of a ZKP is the zero-knowledge succinct non-interactive argument of knowledge ("zk-SNARK").

The zk-SNARK scheme may be useful because the succinct proofs may use relatively little memory space for a blockchain of proofs. Further, the relatively fast verification may allow multiple users that are observing the blockchain to quickly verify a large load of transactions.

The zk-SNARK cryptography may be described in the following three algorithms:

(1) (pk, vk)=SETUP(CS)
(2) ($\pi$)=PROVE(pk, public_data, private_data)
(3) (verified)=VERIFY(vk, $\pi$, public_data)

In these algorithms, "CS" represents a constraint system defining a non-probabilistic or nondeterministic polynomial statement. The constraint system may include the function sought to be proved. Public_data may be the result of the function and private_data may be the underlying data that should remain confidential. In the example above, public_data may be the average temperature measurement, and the private_data may be the individual temperature sensor values.

The SETUP algorithm generates a proving key ("pk") and a verification key ("vk") based on the constraint system. The SETUP algorithm may require random numbers that must be kept secret to ensure that the proof is properly and securely generated.

The PROVE algorithm generates a proof from the proving data, the public_data, and the private data. The symbol $\pi$ may represent the proof itself generated using the proving key as well as public data and private data. In some implementations, the proof $\pi$ may be only 300 bytes long. zk-SNARK may have the benefit of proving a succinct proof, regardless of the complexity of the underlying function.

The VERIFY algorithm uses the vk and the proof, $\pi$, to verify the correctness of the public data. The VERIFY algorithm may return a binary one or zero value indicating whether or not the public data is correct.

The issue of trust also arises in the issuance of assets or representations of assets. These representations may be referred to as notes or tokens. Tokens may represent assets ranging from insurance policies to a particular physical product. A business or company issuing tokens may wish to organize this information using a blockchain implementation. Several blockchain implementations (including cryptocurrency organizations), however, publicly expose the information stored on the blockchain. For cryptocurrency, it may not matter that the total number of currency in circulation is known. But in other implementations, a company may not want to reveal the total amount of assets issued. For example, a company may not want to disclose the total number of products manufactured or the total number of insurance policies issued. In this manner, a company wishing to manage data using a blockchain may risk exposing confidential business information.

While companies may prefer to manage information confidentially, other parties still likely would need to verify that the tokens were validly issued. For example, the company may wish to expose that it has actually issued an asset or a token but may not wish to disclose the type or quantity of asset that has been issued. The company may wish for the other party to be able to verify that assets were issued but may wish to conceal specific information related to the issuance. Further, the company may wish to demonstrate that they have adhered to any administrator or network defined rules related to the issuance.

Improved systems and methods are needed to conceal data related to issuing asset tokens that provide enhanced security and confidentiality while efficiently processing large sets of data and proofs.

BRIEF SUMMARY

Disclosed herein are system, apparatus, device, method and/or computer program product embodiments, and/or combinations and sub-combinations thereof, for privately issuing assets using zero-knowledge proofs.

In an embodiment, an issuance system may issue assets and use zero-knowledge proofs ("ZKPs") to provide proof that the issuance system adhered to rules for issuance. The rules may be administrator or network defined. The assets may be physical assets, such as goods, products, art, as well as securities including bonds, insurance policies, titles to assets, currency, or cryptocurrency. Using the ZKP, the issuance system may provide verification that it issued assets according to the rules for issuance while concealing certain information such as the identity of the issuer, the asset type, an asset identity, and/or a quantity of the asset issued. Verification systems may verify the adherence to the rules for issuance by verifying the ZKP.

In some embodiments, a system for issuing an asset token using ZKPs may comprise a memory and at least one processor coupled to the memory. The processor may be configured to receive a command to issue an asset token to a client. The process more determine that the asset token is allowed to be issued to the client under rules for issuance based on information related to the asset token. The rules for issuance may include a permission to issue a type of asset and the asset token may correspond to the type of asset. When the asset token is determined to be allowed for issuance to the client, the asset token may be issued to the client. The at least one processor may generate a ZKP corresponding to the issuance of the asset token. The ZKP may indicate adherence to the rules for issuance and may conceal information related to the asset token. The at least one processor may publish the ZKP to a blockchain.

In some embodiments, a computer-implemented method for issuing an asset token may include receiving a command to issue an asset token to a client. It may be determined that the asset token is allowed to be issued to the client under the rules based on information related to the asset token. The rules for issuance may include a permission to issue a type of asset and the asset token may correspond to the type of asset. The asset may be allowed to be issued to the client under rules for issuance based on information related to the asset token, wherein the rules for issuance include a permission to issue a type of asset and the asset token may correspond to the type of asset. When the asset is determined to be allowed for issuance to the client, the asset token may be issued to the client. A ZKP may be generated corresponding to the issuance of the asset token. The ZKP may indicate adherence to the rules for issuance and may conceal information related to the asset token. The ZKP may be published to a blockchain.

In some embodiment, a non-transitory computer-readable device is disclosed, the non-transitory computer-readable device may have instructions stored thereon that, when executed by at least one computing device, may cause the at least one computing device to perform the computer-implemented method described above.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
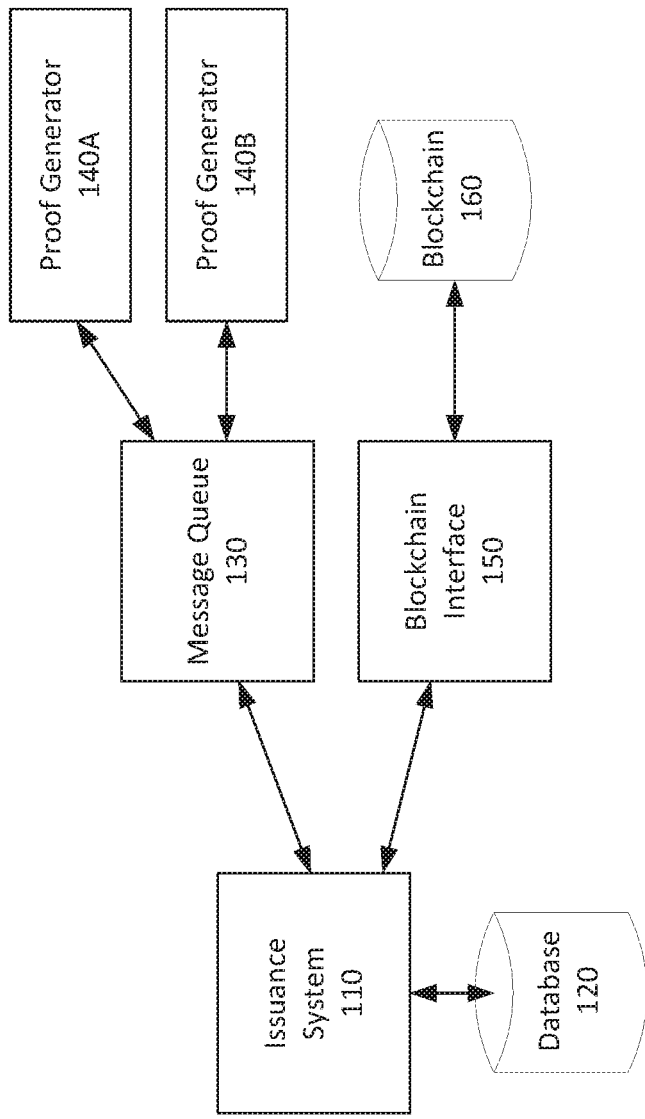
FIG. 1 depicts a block diagram of an issuance environment, according to some embodiments.

Provided herein are system, apparatus, device, method and/or computer program product embodiments, and/or combinations and sub-combinations thereof, for issuing assets using zero-knowledge proofs.

In an embodiment, an issuance system may issue assets and/or asset tokens to clients and generate zero-knowledge proofs ("ZKPs") to prove that the asset and/or asset tokens were issued. This disclosure will herein use the term "asset" to refer to assets as well as representations of assets such as asset tokens or notes. The ZKPs provide verifiable confirmation that asset tokens were issued to a particular client and party. The ZKP may be trustable information such that other parties verifying the ZKP are able to verify that an issuance of assets has occurred. These assets may be physical assets, such as goods, products, art, as well as securities including bonds, insurance policies, currency, or cryptocurrency.

Using the issuance system, businesses may issue assets and/or use blockchain or distributed ledger implementations while concealing private information. The ZKP data structure generated by issuance system may indicate that the issuance system has issued an asset or asset tokens but may conceal desired information. For example, the concealed information may include the identity of the issuer, the particular asset issued, an identification of the asset issued, the type of asset issued, and/or a quantity of the asset issued. In some embodiments, party information may be concealed, such as the issuing system or a receiving system receiving the issued assets. Using ZKPs may allow issuance systems to quickly issue assets and preserve issuance information on a blockchain for managing data.

Some networks or systems may include administrator-defined or network-defined rules specifying the types and/or quantities of assets or asset tokens that the issuance system may issue. The ZKP data structure may allow proof that the issuance has adhered to these rules while also providing confidentiality and verification that an asset has been issued. In this manner, the ZKP data structure provides oversight similar to how distributed ledgers provide oversight in the cryptocurrency context. In contrast to traditional cryptocurrency schemes, however, businesses are able to maintain confidential information.

In addition to confidentiality, the ZKP structure provides a quick and efficient way to generate verification while maintaining confidentiality. In this manner, the processing and generation of ZKPs allows computer systems to quickly issue assets and commit a proof of issuance to a blockchain. Further, in some embodiments, the generation of a ZKP may further be performed faster using multiple proof generators operating in parallel. Similarly, systems attempting to verifying the ZKPs may be able to quickly verify that an issuance has occurred and that the issuance has adhered to issuance rules. The generation of the ZKP may allow the verification system to confirm that the issuance occurred and that the issuance adhered to the issuance rules even when some issuance information may be hidden from the verification system. The verification process may also be finished more quickly because less processing is required. Verification systems may avoid the additional processing steps of processing of the underlying information and may instead rely on the verification of the ZKP.

Various embodiments of these features will now be discussed with respect to the corresponding figures.

FIG. 1 depicts a block diagram of an issuance environment 100, according to some embodiments. Issuance environment 100 may include issuance system 110, which may be configured to communicate with a database 120, message queue 130, and/or a blockchain interface 150. Issuance system 110 may also service one or more client devices and/or issue assets and/or asset tokens to the client devices. In an embodiment, an administrator or administrator system may define issuance rules that define the types of assets and/or quantity of assets that issuance system 110 may issue. In an embodiment, the rules for issuance may be defined by a committee or majority of participants to blockchain 160. For example, the rules for issuance may be defined by a majority vote.

Issuance system 110 may include one or more processors, memory, servers, routers, modems, and/or antennae configured to interface with database 120, message queue 130, and/or a blockchain interface 150. Issuance system 110 may share hardware and/or software components with database 120, message queue 130, and/or a blockchain interface 150. In an embodiment, issuance systems 110 may communicate with database 120, message queue 130, and/or a blockchain interface 150 via a local area network (LAN), a wireless network, and/or via the Internet. Issuance system 110 may use database 120, message queue 130, and/or a blockchain interface 150 to issue assets, generate ZKPs, and/or commit the ZKPs to blockchain 160.

In an embodiment, issuance system 110 may issue assets and/or asset tokens to client devices. These assets may be physical assets, such as goods, products, art, as well as securities including bonds, insurance policies, titles to assets, currency, or cryptocurrency. Tokens may be data representations of these assets. A client device may be a computer system separate from issuance system 110. Different client devices may be associated with different users accounts. The accounts may be decentralized and/or may be associated with a business enterprise platform. In an embodiment, the client devices may be associated with wallets for cryptocurrency.

To issue assets or asset tokens, issuance system 110 may receive a request from a client device. For example, the client device may be an enterprise system and may send a message to issuance system 110 to re quest particular asset tokens. As previously described, the tokens may represent goods or securities. For example, a client device may be browsing an online store and the tokens may represent items added to a cart or purchased. These items may be identified by an asset identification and/or by a quantity purchased. In an embodiment, the client device may request an insurance policy, and issuance system 110 may transfer an asset token to the client device representing the insurance policy.

In an embodiment, issuance system 110 may issue asset tokens independent from a request submitted by a client device. For example, if the assets represent goods, issuance system 110 may track the number of items produced. For example, issuance system 110 may track the number of display screens produced at a facility or sent to a facility. Issuance system 110 may then send a particular number of asset tokens to the client device to inform the client device of this quantity.

Issuance system 110 may also store issuance information in database 120. Database 120 may include state information and/or rules for issuance. State information may refer to past issuance information and/or asset transfer information along with the corresponding cryptographic data related to the issuance. This information may include asset identifications and/or quantities issued as well as client device and/or party information. In an embodiment, the state of asset issuance and ownership may represent a consensus view in relation to a blockchain or distributed ledger. A public state may be recreated from blockchain data while a private state may include the confidential information related to asset ownership. Similarly, database 120 may store public and/or private keys for encrypting the issuance messages and/or ZKPs. For example, database 120 may store a public key corresponding to issuance system 110 and/or a signature corresponding to issuance system 110. Database 120 may be memory internal to issuance system 110 and/or external to issuance system 110.

In issuance environment 100, an administrator system may define rules for issuance. Multiple issuance systems 110 may operate as nodes connecting to blockchain 160. The administrator system may define rules for these nodes indicating the asset identifications and/or quantities of assets that the different nodes may issue. These issuance rules may be enforced and/or validated using public keys corresponding to particular issuance systems 110. In an embodiment, the issuance rules may be part of the public state information of the nodes. The administrator system may add, delete, and/or change the rules for issuance. In an embodiment, the administrator system may assign particular rules to nodes using a public key and/or signature corresponding to the node. In an embodiment, the administrator system may commit these rules to blockchain 160. In this case, nodes in a distributed ledger environment may view the rules and verify that issuances by issuance systems 110 adhere to the rules. In an embodiment, participants on blockchain 160 may define the rules for issuance. For example, the participants may use a committee and/or use a majority voting process to define and/or update the rules for issuance.

When issuance system 110 issues an asset and/or an asset token, issuance system 110 may identify these rules for issuance and/or state information related to the rules. Issuance system 110 may query database 120 to identify these rules. Similarly, database 120 may be updated by issuance system 110 when issuance system 110 receives updated rules from the administrator system or from the other blockchain 160 participants. When issuing an asset and/or asset token, issuance system 110 may identify corresponding rules corresponding to issuance system 110 and/or the assets to be issued.

For example, issuance system 110 may confirm that the rules specify that issuance system 110 may issue the particular assets and asset types desired. Issuance system 110 may compare particular asset identifications with the rules to perform this confirmation. Issuance system 110 may confirm that the current set of issuance rules allows its public key to issue assets.

Issuance system 110 may also confirm that the recipient is able to receive the issued assets. For example, the rules may specify client devices and/or client device identifications permitted to receive the issued assets.

Issuance system 110 may also compare the state information to confirm the quantity of assets issued adheres to the rules. For example, the rules may specify a total number of assets that may be issued. The state information may inform issuance system 110 of the pending amount of assets that have been transferred. Issuance system 110 may use the rules to confirm that the amount to be issued adheres to the cap. In an embodiment, the rules may state a lower limit of assets that may be issued. For example, if an issuance occurs, the rules may require that issuance system 110 issue a minimum number of assets.

After confirming adherence to the rules, issuance system 110 may issue the asset tokens to the client devices. This issuance may be a message transfer and/or may be encrypted for enhanced security. To maintain confidentiality, the issuance of the particular assets and/or quantity of assets may be privately encrypted with a key corresponding to the receiving client device.

While this issuance may remain confidential, issuance system 110 may be required to prove that assets were issued. For example, the administrator system may require proof of an issuance. Other nodes connected to blockchain 160 may also wish to confirm that the rules allow issuance system 110 to issue assets. Users of issuance system 110, however, may wish to maintain confidentiality of particular issuance information such as an identity of issuance system 110, the particular assets issued, and/or the quantity of assets issued. For example, users may wish to conceal business information related to a number of products or securities issued.

To demonstrate adherence to the rules for issuance while maintaining confidentiality, issuance system 110 may generate a zero-knowledge proof ("ZKP"). The ZKP may indicate that issuance system 110 adhered to the rules for issuance and that an issuance of an asset has occurred but may conceal the identity of the issuer, the particular asset or types of assets, and/or the quantity of assets issued. A ZKP may be a protocol or function applied to underlying data to indicate that the underlying data is true without revealing the underlying data itself. The result generated from the ZKP process may allow a verifier to verify that a statement provided by the prover is true. In this case, the generated ZKP may identify the issuance system 110 by a public key corresponding to issuance system 110. Upon verification of the ZKP, other nodes may confirm that the resulting key corresponds to issuance system 110 and confirm that issuance system 110 adhered to the rules for issuance. In an embodiment, the key may be embedded in the rules for issuance, and the signature of the issuance may be verified because the public key matches the public key appearing in the rule. The nodes of the network may verify that the public key appears in one of the rules and that the asset identification issued adheres to the rule as well as the quantity of assets issued.

In an embodiment, the ZKP may use a zk-SNARK scheme. The zk-SNARK scheme may be useful because the succinct proofs may use relatively little memory space for a blockchain of proofs. Further, the relatively fast verification may allow multiple users that are observing the blockchain to quickly verify a large load of transactions. As previously described, the zk-SNARK scheme may use three algorithsm:

(1) (pk, vk)=SETUP(CS)
(2) ($\pi$)=PROVE(pk, public_data, private_data)
(3) (verified)=VERIFY(vk, $\pi$, public_data)

In these algorithms, "CS" represents a constraint system defining a non-probabilistic or nondeterministic polynomial statement. The constraint system may include the function sought to be proved. Public_data may be the result of the function and private_data may be the underlying data that should remain confidential. The private_data may include the identity of the issuer, the type of asset issued, and/or the quantity of assets issued. The public_data may include the rules for issuance indicating the assets and/or asset quantities that the issuance system 110 is permitted to issue.

By generating the proof, $\pi$, representing the proof generated using the proving key as well as public data and private data, an issuance system 110 may demonstrate adherence to the public data issuance rules. As inputs to PROVE function, issuance system 110 may supply the proving key, along with the rules, and the actual assets or asset quantities issued as the private data. Based on this information, a verification system may apply the VERIFY function using the proof, $\pi$, as well as the public rules to verify proof and to recognize that issuance system 110 has adhered to the rules.

For example, when issuing asset tokens, the rules for issuance may allow issuance system 110 to issue no more than one hundred widgets and that issued widgets must be of Widget Type A, B, or C. This information may be public. In the private data, issuance system 110 may issue fifty asset tokens of Widget Type B to a client. In generating the ZKP, issuance system 110 may supply the rule for issuance as well as the private data representing the actual issued asset tokens. The generated proof, $\pi$, may then indicate that issuance system 110 has adhered to the rule for issuance. A verification system may then easily verify this adherence using proof, $\pi$, as well as the public data representing the rule for issuance. In this manner, the verification system may verify the proof without accessing the underlying widget type or quantity information.

In an embodiment, issuance system 110 may generate a ZKP. In an embodiment, issuance system 110 may use message queue 130 and/or proof generators 140 to generate the ZKP. Message queue 130 may be a message broker and/or may distribute proving tasks to proof generators 140. In this manner, message queue 130 may allow for scalability and may manage the proof generator among many proof generators 140. While proof generators 140A and 140B are shown in FIG. 1, other proof generators 140 may be used and/or scaled to generate ZKPs. In this manner, the generation of a ZKP may be performed quickly in view of the parallel processing that the proof generators 140 may use. In an embodiment, proof generators 140 may be specialized processors and/or CPU cores. Proof generators 140 may use logic configured to generate the ZKPs allowing scalability.

After generating a ZKP, issuance system 110 may use blockchain interface 150 to commit the ZKP to blockchain 160. Blockchain interface 150 may share software and/or hardware with issuance system 110. In an embodiment, blockchain interface 150 may act as a standalone system. Blockchain interface 150 may translate data received from issuance system 110 and/or format the data to be stored on blockchain 160. Blockchain interface 150 may asynchronously submit transactions and/or issuance information to blockchain 160.

In an embodiment, blockchain interface 150 may be stateless and/or may query blockchain 160 to retrieve information from blockchain 160. Blockchain interface 150 may return block details according to a given block number, such as a block-hash, previous block-hash, and/or list of protocol transactions included in the block. Blockchain interface 150 may also obtain transaction status information. In the case of a blockchain reorganization, blockchain interface 150 may detect the reorganization and update the state information maintained by issuance system 110 and/or database 120. In this manner, blockchain interface 150 may also identify updated rules from an administrator system or blockchain 160 network that has updated the rules and informed the nodes via blockchain 160. This querying of blockchain 160 may occur independent from issuance events. In an embodiment, while issuance system 110 may use the most recent rules stored in database 120, issuance system 110 may not query blockchain 160 every time an issuance event occurs.

After issuance system 110 has issued an asset or asset token and committed a ZKP to blockchain 160 indicating the issuance, other nodes connected to blockchain 160 may verify the ZKP. As previously described, this verification may identify the key used by issuance system 110 and verify that issuance system 110 adhered to the rules for issuance. The verification of the ZKP may be short and easily computed. In this manner, other nodes are able to quickly confirm adherence to the rules for issuance while issuance system 110 may maintain confidentiality regarding the details of the issuance. For example, details related to the identity of the issuer, asset identifications, asset types, and/or quantity of assets may be hidden from the verifier nodes. In this manner, using ZKPs allows issuance system 110 to quickly generate proofs while maintaining confidentiality and also allows verifier systems to quickly verify proofs, reducing the processing needed to confirm an issuance of assets or asset tokens.

Figure 2:
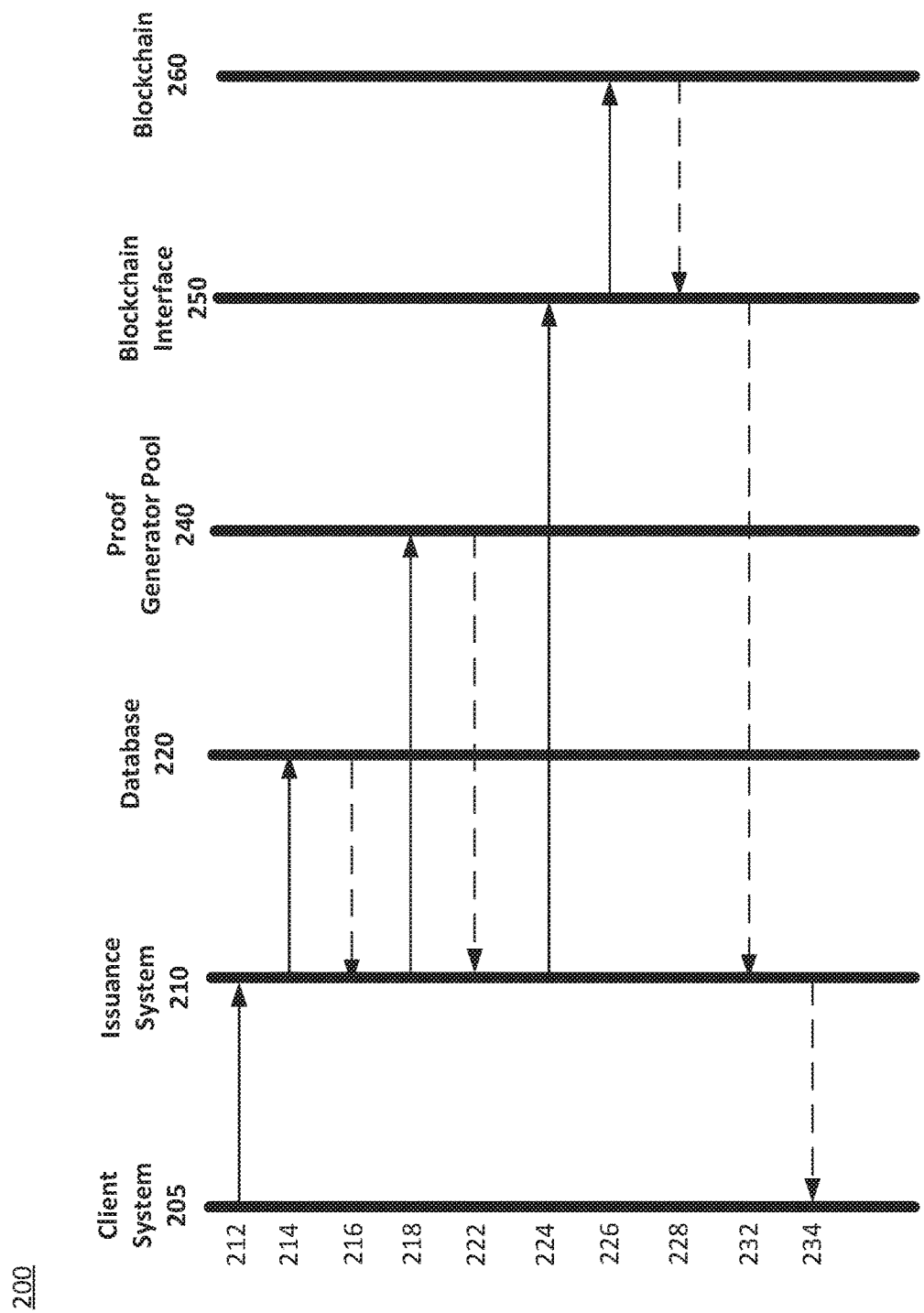
FIG. 2 depicts a flow diagram illustrating a flow for issuing an asset, according to some embodiments.

FIG. 2 depicts a flow diagram illustrating a flow 200 for issuing an asset, according to some embodiments. The flow 200 may include a client system 205 and issuance system 210 configured to issue assets or asset tokens as described with reference to FIG. 1.

At 212, client system 205 may initiate a request for assets to issuance system 210. In an embodiment, client system 205 may transmit a message to issuance system 210 and/or may use an HTTP request. Client system 205 may use an API to initiate the request. In an embodiment, client system 205 may operate on behalf of other clients and may perform a request on behalf of the other clients. For example, client system 205 may be a broker or provide a service to request assets. For example, if the asset is an insurance policy, client system 205 may request the issuance of the insurance policy on behalf of a party to be insured.

At 214, issuance system 210 may query database 220 to retrieve state information and/or rules for issuance. Database 220 may return the state information and/or rules for issuance at 216. Using the state information and/or rules for issuance, issuance system 210 may confirm whether it can issue the requested assets. For example, the rules for issuance may indicate particular types of assets that may be issued, an asset identification, and/or quantity of assets that may be issued. The rules for issuance may specify particular parties, such as client system 205, that may receive the assets. Issuance system 210 may retrieve these rules to confirm that an issuance of assets to client system 205 in view of the request is allowed. To perform this determination, issuance system 210 may also use state information. For example, if a rule specifies a quantity of assets that issuance system 210 may issue, confirming the state information may allow issuance system 210 to confirm that it is able to issue additional assets.

Upon determining that an issuance of assets or asset tokens would adhere to the rules for issuance, issuance system 210 may issue the requested assets to client system 205. Before, simultaneously with, or after this issuance, issuance system 210 may access proof generator pool 240 to generate a ZKP indicating that it has adhered to the rules for issuance in issuing the assets. Issuance system 210 may use a message queue to manage the generation of the ZKP among multiple proof generators, such as proof generators 140 as described with reference to FIG. 1. In this manner, the generation of the ZKP may be performed by proof generators operating in parallel to quickly generate a ZKP. In an embodiment, proof generator pool 240 may use the zk-SNARK scheme to generate the ZKP. The ZKP may identify that issuance system 210 has adhered to the rules for issuance while maintaining confidentiality related to the identity of the issuer, the asset type, asset identification, and/or quantity of assets issued.

At 222, after the generation of the ZKP, proof generator pool 240 may deliver the ZKP to issuance system 210. A message queue may manage proof generator pool 240 and return the ZKP. At 224, issuance system 210 may commit the transaction to blockchain 260 using blockchain interface 250. At 226, blockchain interface 250 may perform a translation of the ZKP data delivered from issuance system 210 to a format that may be stored on blockchain 260. Storing the ZKP on blockchain 260 may allow other nodes and/or systems to confirm that issuance system 210 adhered to the rules for issuance. The other nodes may apply a verification key that may correspond to a prover key to verify the ZKP. This proof may be arithmetic computation an confirms that the adherence to the rules based on a signature corresponding to the issuance system 210 as well as the signature being available in the public rules. This process may also aid in verifying the integrity of the shared state information while maintaining confidentiality.

At 228, upon committing the ZKP to blockchain 260, blockchain interface 250 may provide a confirmation of the posted ZKP. At 232, blockchain interface 250 may deliver the confirmation to issuance system 210. Issuance system 210 may then deliver the confirmation to client system 205 at 234.

Figure 3:
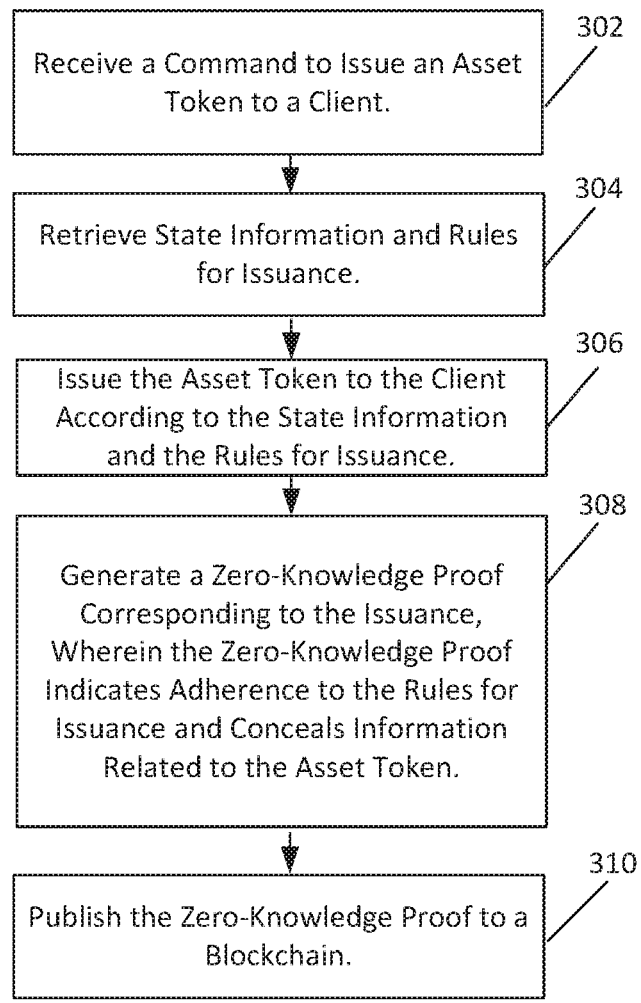
FIG. 3 depicts a flowchart illustrating a method for issuing an asset using a zero-knowledge proof, according to some embodiments.

FIG. 3 depicts a flowchart illustrating a method 300 for issuing an asset using a zero-knowledge proof, according to some embodiments. Method 300 shall be described with reference to FIG. 1; however, method 300 is not limited to that example embodiment.

In an embodiment, issuance system 110 may utilize method 300 to generate issue an asset or asset token. While method 300 is described with reference to issuance system 110, method 300 may be executed on any computing device, such as, for example, the computer system described with reference to FIG. 4 and/or processing logic that may comprise hardware (e.g., circuitry, dedicated logic, programmable logic, microcode, etc.), software (e.g., instructions executing on a processing device), or a combination thereof.

It is to be appreciated that not all steps may be needed to perform the disclosure provided herein. Further, some of the steps may be performed simultaneously, or in a different order than shown in FIG. 3, as will be understood by a person of ordinary skill in the art.

At 302, issuance system 110 may receive a command to issue an asset token to a client. The client may transmit this command or the issuance system 110 may receive the command from a user supplying commands to issuance system 110. For example, if issuance system 110 hosts a business enterprise platform, a user may interact with the platform to supply the command. The user may also specify the client using an identification or address corresponding to the client. In an embodiment, the assets may include cryptocurrency and the client may be cryptocurrency wallet.

At 304, issuance system 110 may retrieve state information and rules for issuance. Issuance system 110 may retrieve this information from a database 120 that may be internal or external to issuance system 110. State information may refer to past issuance information and/or asset transfer information along with the corresponding cryptographic data related to the issuance. This information may include asset identifications and/or quantities issued as well as client device and/or party information. In an embodiment, the state of asset issuance and ownership may represent a consensus view in view of a blockchain or distributed ledger. A public state may be recreated from blockchain data while a private state may include the confidential information related to asset ownership.

The rules for issuance may be administrator-defined rules indicating issuance parameters for issuance system 110. For example, the rules for issuance may indicate particular types of assets that may be issued, an asset identification, and/or quantity of assets that may be issued. The rules for issuance may specify particular parties, such as the client, that may receive the assets. The rules for issuance in database 120 may be updated by an administrator via a broadcast of updated rules committed to blockchain 160. Issuance system 110 may update the rules stored in database 120 when the rules on blockchain 160 are updated. At 304, issuance system 110 may retrieve the state information and/or rules for issuance from blockchain 160. In an embodiment, the rules for issuance may be network-defined. Participants on blockchain 160 may define the rules for issuance. For example, the participants may use a committee and/or use a majority voting process to define and/or update the rules for issuance.

At 306, issuance system 110 may issue the asset token to the client according to the state information and the rules for issuance. Issuance system 110 may confirm that the rules for issuance are not violated and determine that the asset is allowed to be issued to the client. In an embodiment, issuance system 110 may use the state information to confirm this adherence. The state information may include private and/or public information and may also be used to confirm consistency with other nodes connected to blockchain 160. After confirming that the issuance would not violate a rule, issuance system 110 may issue the asset token to the client.

At 308, issuance system 110 may generate a zero-knowledge proof corresponding to the issuance, wherein the zero-knowledge proof indicates adherence to the rules for issuance and conceals information related to the asset token. In an embodiment, issuance system 110 may use the zk-SNARK scheme to generate the ZKP. The ZKP may be generated by issuance system 110 and/or use one or more proof generators 140. The ZKP may indicate that issuance system 110 adhered to the rules for issuance and that an issuance of an asset has occurred but may conceal the identity of the issuer, the particular asset or types of assets, and/or the quantity of assets issued. When applying the zk-SNARK scheme, issuance system 110 may produce proof, $\pi$.

As previously described, a ZKP may be a protocol or function applied to underlying data to indicate that the underlying data is true without revealing the underlying data itself. The result generated from the ZKP process may allow a verifier to verify that a statement provided by the prover is true. In this case, the generated ZKP may identify the issuance system 110 by a public key corresponding to issuance system 110 and may compute the proof using public data related to the rules for issuance and the private data related to the issued assets. Upon verification of the ZKP, other nodes may confirm that the key corresponds to issuance system 110 and confirm that issuance system 110 adhered to the rules for issuance. In an embodiment, the signature of the issuance is verified with the public key that appears in the rule. The nodes of the network may verify that the public key appears in one of the rules and that the asset identification issued adheres to the rule as well as the quantity of assets issued.

At 310, issuance system 110 may publish the ZKP to a blockchain 160. Issuance system 110 may publish the ZKP using a blockchain interface 150 to translate the data to a form storable on blockchain 160. Other verification nodes may verify the issuance system 110 by accessing the ZKP. In this manner, the verification nodes may verify that issuance system 110 issued the asset token in adherence to the rules but without identifying the underlying asset or quantity of the assets issued.

Blockchain 160 may be privately or publicly maintained. For example, if a business maintains blockchain 160 with different systems represented by different issuance systems 110, blockchain 160 may be considered private as the nodes that are able to access blockchain 160 may all be controlled by the business. In this manner, verification may be completed by nodes controlled by the business. This configuration may allow business to continue to quickly verify that issuance systems 110 have adhered to the particular rules defined by an administrator or a committee or majority of blockchain 160 participants.

In an embodiment, blockchain 160 may be publicly maintained. In this manner, the ZKP structure may allow for confidentiality in demonstrating that an issuance occurred in adherence to the rules. Verification nodes in different locations may quickly verify the ZKP in view of its easily verifiable structure. In this manner, systems processing verifications of issuance transactions may be able to more quickly verify issuances.

Figure 4:
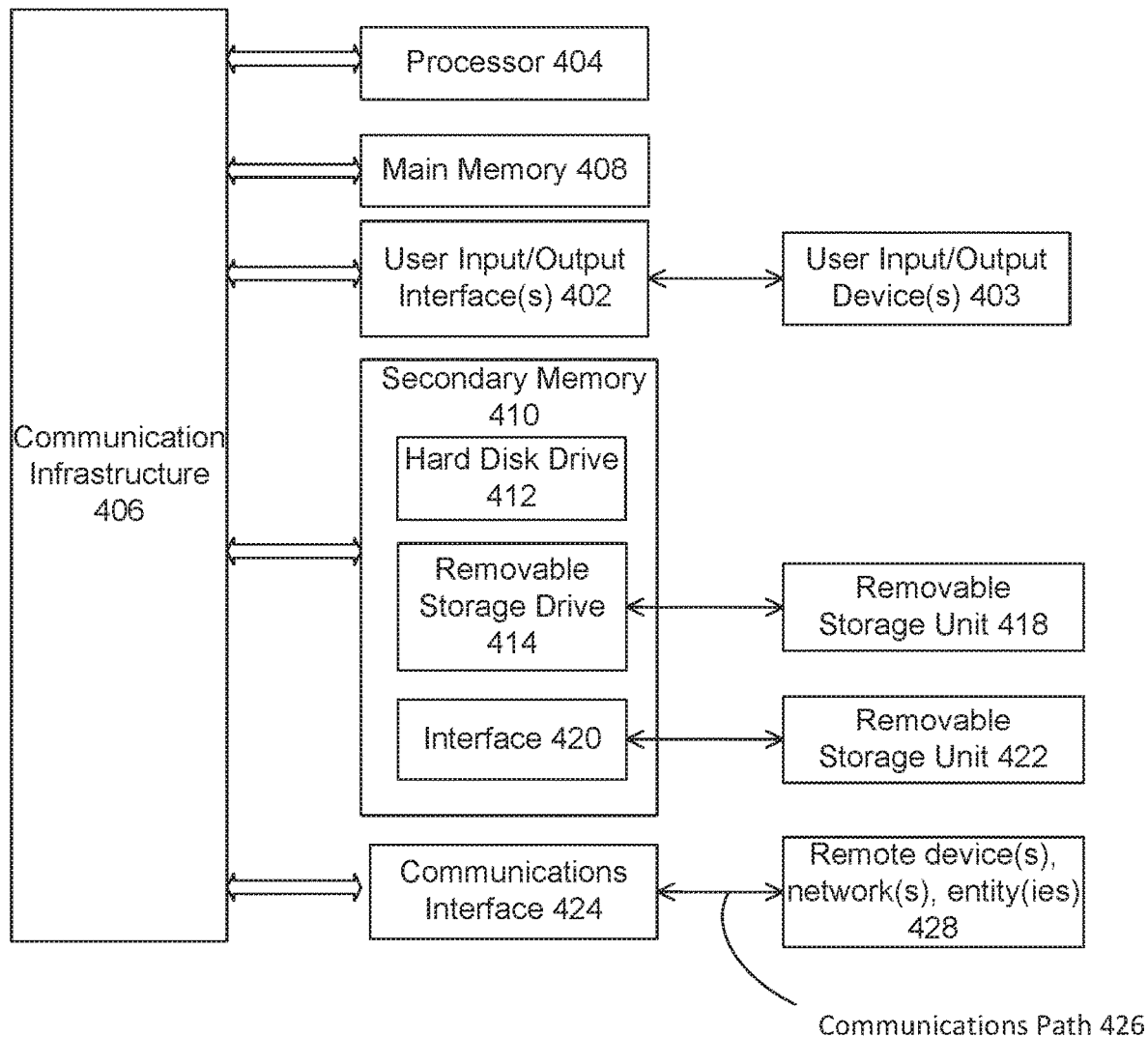
FIG. 4 depicts an example computer system useful for implementing various embodiments.

FIG. 4 depicts an example computer system useful for implementing various embodiments.

Various embodiments may be implemented, for example, using one or more well-known computer systems, such as computer system 400 shown in FIG. 4. One or more computer systems 400 may be used, for example, to implement any of the embodiments discussed herein, as well as combinations and sub-combinations thereof.

Computer system 400 may include one or more processors (also called central processing units, or CPUs), such as a processor 404. Processor 404 may be connected to a communication infrastructure or bus 406.

Computer system 400 may also include user input/output device(s) 403, such as monitors, keyboards, pointing devices, etc., which may communicate with communication infrastructure 406 through user input/output interface(s) 402.

One or more of processors 404 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 may also include a main or primary memory 408, such as random access memory (RAM). Main memory 408 may include one or more levels of cache. Main memory 408 may have stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418.

Removable storage unit 418 may include a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 may read from and/or write to removable storage unit 418.

Secondary memory 410 may include other means, devices, components, instrumentalities or other approaches for allowing computer programs and/or other instructions and/or data to be accessed by computer system 400. Such means, devices, components, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 may enable computer system 400 to communicate and interact with any combination of external devices, external networks, external entities, etc. (individually and collectively referenced by reference number 428). For example, communication interface 424 may allow computer system 400 to communicate with external or remote devices 428 over communications path 426, which may be wired and/or wireless (or a combination thereof), and which may include any combination of LANs, WANs, the Internet, etc. Control logic and/or data may be transmitted to and from computer system 400 via communication path 426.

Computer system 400 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 400 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 400 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 4. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method, comprising:
receiving a command to issue an asset token to a client;
determining the asset token is allowed to be issued to the client under public rules for issuance based on information related to the asset token, wherein the public rules for issuance include a permission to issue a type of asset and wherein the asset token corresponds to the type of asset, wherein the determining further comprises:
retrieving past issuance information indicating a quantity of asset tokens previously issued; and determining that issuing the asset token in addition to the quantity of asset tokens previously issued does not violate the public rules for issuance;

in response to determining that the asset token is allowed for issuance to the client based on an adherence to the public rules for issuance:

issuing the asset token to the client;

generating a zero-knowledge proof corresponding to the issuing such that the zero-knowledge proof indicates adherence to the public rules for issuance while concealing the type of asset corresponding to the asset token; and publishing the zero-knowledge proof to a blockchain.

2. The computer-implemented method of claim 1, wherein the public rules for issuance include a permission to issue a quantity of an asset corresponding to the type of asset.

3. The computer-implemented method of claim 1, further comprising:

querying the blockchain to identify updated rules for issuance.

4. The computer-implemented method of claim 1, wherein generating the zero-knowledge proof further comprises:

generating a zero-knowledge proof using parallel processing.

5. The computer-implemented method of claim 1, wherein generating the zero-knowledge proof further comprises:

generating a zero-knowledge proof that is verifiable using a public key corresponding to a system issuing the asset token to the client.

6. The computer-implemented method of claim 1, wherein the zero-knowledge proof further conceals a quantity of the asset.

7. The computer-implemented method of claim 1, wherein the zero-knowledge proof further conceals an identification of an issuer.

8. A system, comprising:

a memory; and at least one processor coupled to the memory and configured to:

receive a command to issue an asset token to a client;

determine the asset token is allowed to be issued to the client under public rules for issuance based on information related to the asset token, wherein the public rules for issuance include a permission to issue a type of asset and wherein the asset token corresponds to the type of asset, wherein to determine the asset token is allowed to be issued, the at least one processor is further configured to:

retrieve past issuance information indicating a quantity of asset tokens previously issued; and determine that issuing the asset token in addition to the quantity of asset tokens previously issued does not violate the public rules for issuance;

in response to determining that the asset token is allowed for issuance to the client based on an adherence to the public rules for issuance:

issue the asset token to the client;

generate a zero-knowledge proof corresponding to the issuing such that the zero-knowledge proof indicates adherence to the public rules for issuance while concealing the type of asset corresponding to the asset token; and publish the zero-knowledge proof to a blockchain.

9. The system of claim 8, wherein the public rules for issuance include a permission to issue a quantity of an asset corresponding to the type of asset.

10. The system of claim 8, wherein the at least one processor is further configured to:

query the blockchain to identify updated rules for issuance.

11. The system of claim 8, wherein to generate the zero-knowledge proof, the at least one processor is further configured to:

generate a zero-knowledge proof using parallel processing.

12. The system of claim 8, wherein to generate the zero-knowledge proof, the at least one processor is further configured to:

generate a zero-knowledge proof that is verifiable using a public key corresponding to the system issuing the asset token to the client.

13. The system of claim 8, wherein the zero-knowledge proof further conceals a quantity of the asset.

14. The system of claim 8, wherein the zero-knowledge proof further conceals an identification of the system.

15. A non-transitory computer-readable device having instructions stored thereon that, when executed by at least one computing device, cause the at least one computing device to perform operations comprising:

receiving a command to issue an asset token to a client;

determining the asset token is allowed to be issued to the client under public rules for issuance based on information related to the asset token, wherein the public rules for issuance include a permission to issue a type of asset and wherein the asset token corresponds to the type of asset, wherein the determining further comprises:

retrieving past issuance information indicating a quantity of asset tokens previously issued; and determining that issuing the asset token in addition to the quantity of asset tokens previously issued does not violate the public rules for issuance;

in response to determining that the asset token is allowed for issuance to the client based on an adherence to the rules for issuance:

issuing the asset token to the client;

generating a zero-knowledge proof corresponding to the issuing such that the zero-knowledge proof indicates adherence to the public rules for issuance while concealing the type of asset corresponding to the asset token; and publishing the zero-knowledge proof to a blockchain.

16. The non-transitory computer-readable device of claim 15, wherein the public rules for issuance include a permission to issue a quantity of an asset corresponding to the type of asset.

17. The non-transitory computer-readable device of claim 15, the operations further comprising:

querying the blockchain to identify updated rules for issuance.

18. The non-transitory computer-readable device of claim 15, wherein to generate the zero-knowledge proof, the operations further comprise:

generating a zero-knowledge proof using parallel processing.

19. The non-transitory computer-readable device of claim 15, wherein to generate the zero-knowledge proof, the operations further comprise:

generating a zero-knowledge proof that is verifiable using a public key corresponding to a system issuing the asset token to the client.

20. The non-transitory computer-readable device of claim 15, wherein the zero-knowledge proof further conceals a quantity of the asset.

\* \* \* \* \*